Aug. 19, 1941.  F. W. GROHN  2,253,466
OVERLOAD RELEASING CLUTCH
Filed Feb. 23, 1940   2 Sheets-Sheet 1
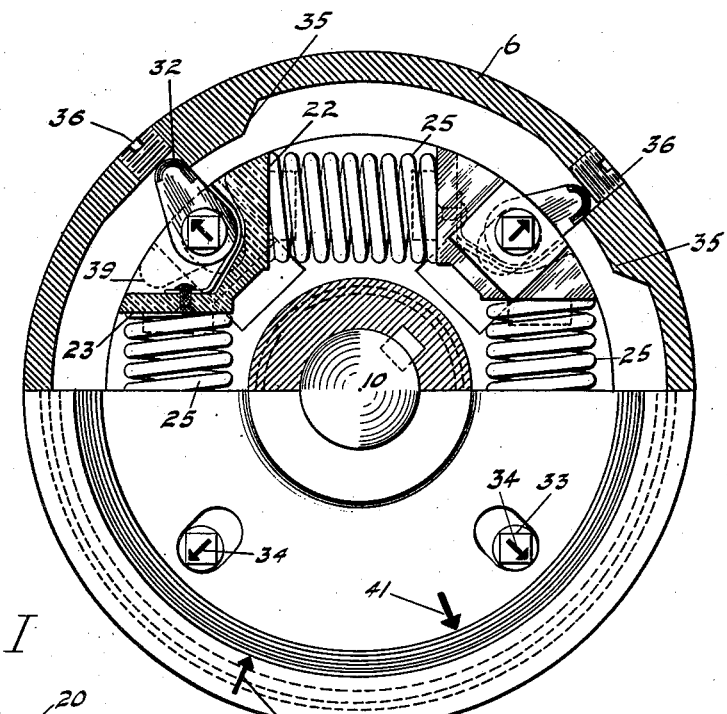
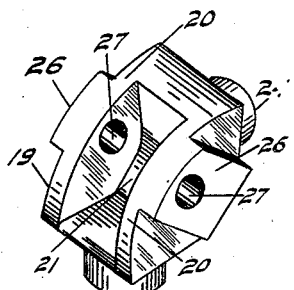
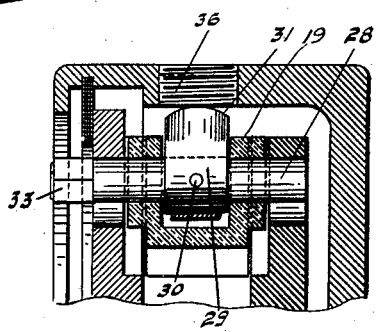
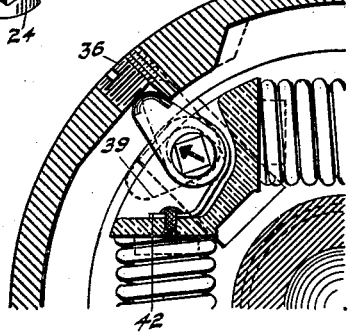
INVENTOR.
Fred W. Grohn
BY
Lee J. Gary
ATTORNEY.

Aug. 19, 1941.   F. W. GROHN   2,253,466
OVERLOAD RELEASING CLUTCH
Filed Feb. 23, 1940   2 Sheets-Sheet 2
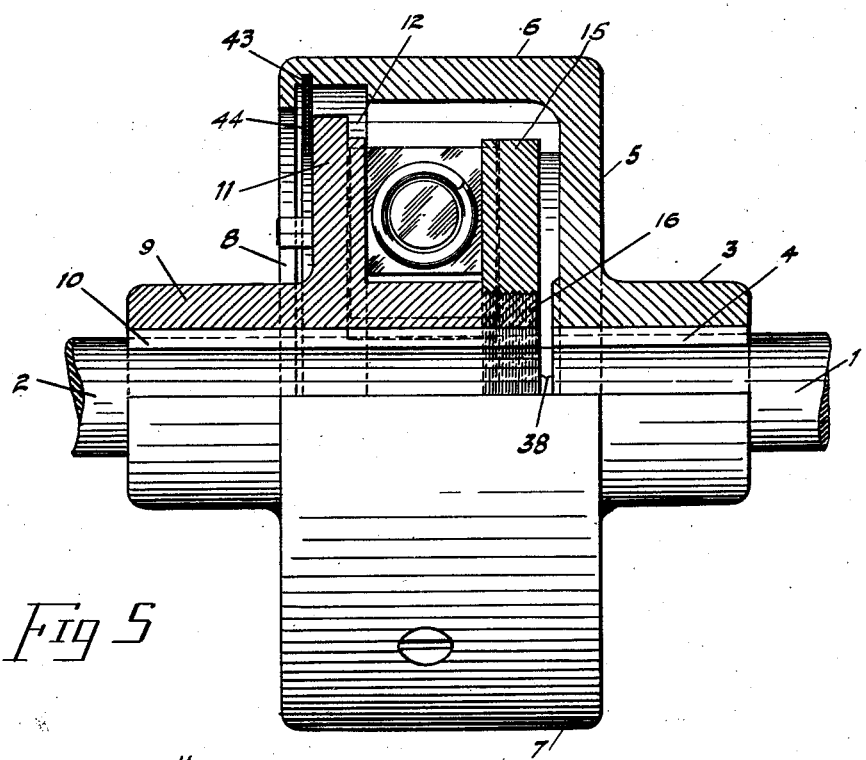
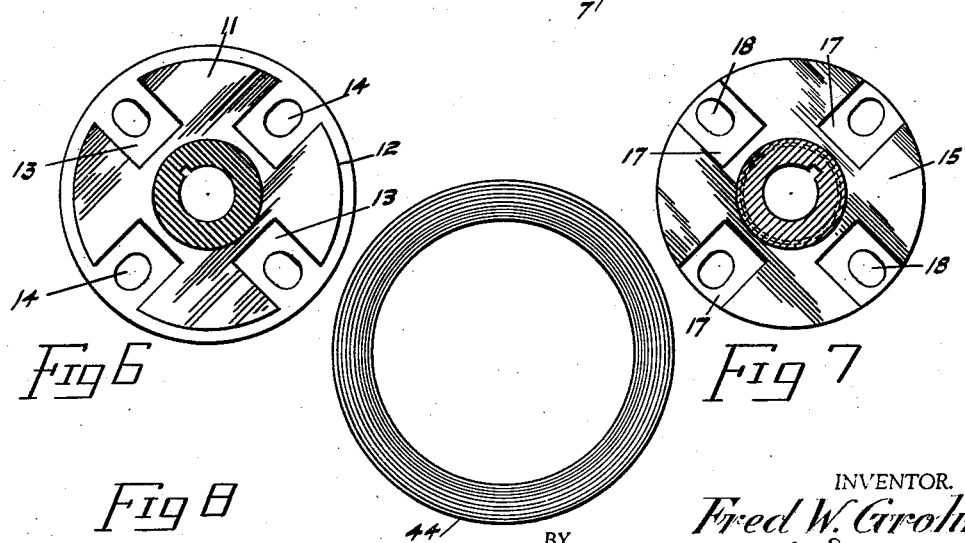
INVENTOR.
Fred W. Grohn
ATTORNEY.

Patented Aug. 19, 1941

2,253,466

UNITED STATES PATENT OFFICE 2,253,466

OVERLOAD RELEASING CLUTCH

Fred W. Grohn, Chicago, Ill., assignor of thirty per cent to John J. Lavin, twenty per cent to John J. Pubins, seventeen and one-half per cent to Frank Kunza, twenty per cent to Henry P. Grohn, and five per cent to Gus Skly, Chicago, Ill.

Application February 23, 1940, Serial No. 320,253

6 Claims. (Cl. 192—56)

This invention relates to improvements in power transmission clutches, and refers specifically to a device which when in operation combines the functions of a flexible coupling and clutch, the device being characterized in that it automatically releases when a predetermined overload is applied to the driven system.

One of the features of the apparatus comprising my invention resides in its operation as an overload releasing clutch whereby sudden overloads upon the driven system automatically and instantaneously cause the clutch to disengage the driving from the driven system. The device is further characterized in that the load at which the clutch releases may be adjusted to meet the requirements and peculiarities of the apparatus comprising the driven system, and the prime mover and other apparatus comprising the driving system.

It is frequently desirable, in mechanism trains comprising a device for performing a predetermined operation which in its nature is subjected to unexpected sudden overloads, to release said device from the driving system when the overload occurs without stopping the prime mover and other mechanisms associated with the prime mover. In such a situation my device efficiently fulfills the need inasmuch as it acts instantaneously and reliably and its efficiency as a clutch and coupling is very high.

Another feature of the apparatus comprising my invention resides in its operation as a flexible coupling between driving and driven members whereby shocks are cushioned that may develop in starting and safe operating loads. The device is also characterized in that it is provided with sufficiently flexible driving contacts and clearances to cushion and equalize the usual tolerated misaligned shaft stresses and strains, which, of course, avoids injuries and wear upon the connected machines, transmission shafts and bearings, in addition to suppressing vibration and preventing undue noise.

Other objects and advantages of my invention will be apparent from the accompanying drawings and following detailed description.

In the drawings, Fig. 1 is an end elevational view partly in section, of an embodiment of my invention.

Fig. 2 is a detailed perspective view illustrating one of the spring seat members utilized in my device.

Fig. 3 is a fragmentary sectional view of one of the engaging members in operative position.

Fig. 4 is a fragmentary sectional view, illustrating several positions of one of the engaging members.

Fig. 5 is a side elevational view, partly in section, illustrating the device shown in Fig. 1.

Fig. 6 is a transverse sectional view, illustrating the flange on one of the shaft-engaging collars.

Fig. 7 is a similar sectional view illustrating a flange spaced from the flange shown in Fig. 6.

Fig. 8 is a face view of a sealing ring employed in my device.

Referring in detail to the drawings, 1 and 2 indicate a pair of end abutting shafts, one a driving and the other a driven shaft. For purposes of description, shaft 1 will hereinafter be considered the driving shaft and shaft 2 the driven shaft. However, as will be apparent from the following description, either shaft may be the driving agency and either the driven.

A collar 3 is mounted upon shaft 1 and is keyed thereto by key 4, which registers with keyways (not shown) in shaft 1 and collar 3. An annular flange 5 is formed integral with collar 3, said flange terminating in an outwardly extending ring 6, which, with flange 5 provides a cup-like housing 7, the interior of which is accessible through opening 8.

A collar 9 is mounted upon the end of shaft 2 and is keyed thereto by key 10 which registers with keyways provided in shaft 2 and the interior wall of the collar 9. Intermediate the length of collar 9 an outwardly extending flange 11 is formed integral with said collar, said flange being provided with an annular rabbet 12 at one face thereof and adjacent the periphery of the flange. A plurality of circumferentially spaced recesses 13 are provided in the face of the flange, said recesses being substantially rectangular in shape and spaced in quadrature around the flange. All of the recesses 13 open into the rabbeted portion of the flange and are of a depth substantially equal to said rabbet. Elongated, substantially oval openings 14 are provided in the flange 11, one opening being provided in each recess 13, and the major axis of each of said ovals being radially disposed.

A flange 15 is mounted upon collar 9 and is spaced from flange 11. The flange 15 may be engaged with collar by means of screw threads 16; may be welded upon said collar or may be formed integral therewith, as desired. One face of the flange 15, that face which is opposite from flange 11, is provided with four circumferentially spaced, substantially rectangular recesses 17, said recesses being identical with recesses 13 and being positioned in alignment with the latter recesses. Oval openings 18 are provided in flange 15, one opening being provided in each recess. The openings 18, similar to openings 14, have their major axes disposed radially with respect to shaft 2.

As will be hereinafter more fully described, the opposite flanges 11 and 15 are adapted to carry a plurality of abutment members 19. Each abutment member comprises a pair of spaced sides 20 joined by a warped web 21. The warped web 21, together with the sides 20 define a recess in the abutment member. Adjacent the ends the warped web 21 is provided with flat faces 22 and 23 disposed in planes at right angles to each other. A boss 24 protrudes from each of the faces 22 and 23 and together with said faces provide a seat for coil springs 25.

A block 26 protrudes from each of the sides 20 of the abutment member, the transverse dimensions of said blocks being such as to permit them to be slidably carried in the opposite recesses 13 and 17 in the flanges 11 and 15, respectively. An opening 27 is provided in each of the blocks 26 and sides 20, said openings being in alignment with each other whereby to receive a shaft 28. A lug 29 is carried upon each shaft 28 within the recess in the abutment member 19 and is rigidly secured to said shaft by means of pin 30 or otherwise. The operating end of the lug 29 is rounded both across its width, as indicated at 31 in Fig. 3, and partially across its thickness, as indicated at 32 in Fig. 1.

Shaft 28 passes through openings 27 and extends, at opposite ends, through the oval openings 14 and 18 in flanges 11 and 15, respectively. One end 33 of each shaft 28 protrudes through opening 14, said end being squared whereby said shaft may be conveniently rotated by the application of a suitable wrench. Indicia 34 is provided upon the end 33 of each shaft whereby the position of lug 29 is indicated.

In assembling my device a coil spring 25 is brought into seating position upon opposite faces 22 and 23 of adjacent abutment members 19, the coil springs embracing bosses 24 on each face. Blocks 26 carried by the sides of each abutment member are positioned in recesses 13 and 17 whereby a quadrature arrangement of alternate coil springs 25 and abutment members 19 is provided. It can readily be seen that radial movement of the abutment members compresses, or relieves the compression upon the springs 25. If flange 15 is permanently mounted upon collar 9 before shafts 28 and lugs 29 are in position upon the abutment members, said shafts may be inserted through openings 14, 18 and 27, and lugs 29 can be secured to said shaft. If flange 15 is the last element assembled, the order of operations is obvious.

The arrangement is such that the sides 20 of the abutment member will never protrude beyond the periphery of flange 15 due to the fact that shaft 28 will reach its radially outward limiting position in openings 14 and 18 prior to such protrusion. Under normal conditions springs 25 will be under a slight degree of compression when said shafts are in the position hereinbefore mentioned and, consequently, the abutment elements will normally be disposed in their outermost radial position.

Lugs 35 are carried by, and are preferably formed integral with ring 6, and extend radially inwardly from the inner surface of the ring. Lugs 35 are positioned parallel to the axis of shaft 1 and are circumferentially spaced 90° from each other. A threaded opening is provided in the wall of the ring 6 adjacent each lug 35 and each opening is adapted to receive a threaded plug 36.

In operation, the shafts 1 and 2 are disposed in substantially axial alignment. The geometrical dimensions of my device are such that a degree of clearance indicated at 38 in Fig. 5 exists between the abutting ends of the shafts whereby tolerated misalignment of the shafts may exist without actual physical contact between the abutting ends of the shaft. It can readily be seen that when the shafts are so disposed, that portion of the collar 9 which carries flanges 11 and 15, will be disposed within the housing 7. To permit tolerated misalignment of the two shafts, sufficient clearance is provided between the peripheries of the flanges 11 and 15 so that said flanges will not contact the ring portion 6 of the housing 7.

When the collar 9 has been inserted in the housing 7, the lugs 29 are preferably disposed in the position indicated in dotted lines at 39 in Figs. 1 and 4. An index 40 is provided upon the housing 7 and an index 41 is also provided upon the outer face of the flange 11. When the two shafts are brought together, (index 41 is brought into registration with index 40 or vice versa by manually rotating shaft 2 or 1. When these indexes are in registration, the abutment members 19 are positioned circumferentially midway between adjacent lugs 35. At this position lugs 29 may be rotated from the dotted line position indicated at 39 to an angular position on the opposite side of the radial line through the center of the shaft 2 and the center of the shafts 28. The lugs 29, of course, may be rotated by the application of a suitable wrench to the square heads 33 of the shafts 28. When the lugs 29 have been rotated to operable position, the indices 34 carried upon the ends of the shafts 28 will point in a radial direction. Shaft 1 may then be rotated relative to shaft 2 or vice versa until the working faces of the lugs 29 are positioned in contact with those faces of lugs 35 adjacent plugs 36. This is the operable position of the respective elements constituting my invention.

For the sake of example, we shall consider shaft 1 as the driving shaft and shaft 2 as the driven shaft and that rotation takes place in a counter-clockwise direction as viewed in Fig. 1. It can readily be seen that the lugs 35 upon the inner face of the housing 7 will bear against the working faces of lugs 29. It will also be seen that plugs 36 bear against the working faces of lugs 29 in a radial direction. Consequently, when rotation of the housing 6 takes place, a force is exerted radially inwardly upon each of the abutment members which force is resisted by the compression of the coil springs 25. When the device is adjusted for a predetermined load, the coil springs will not permit sufficient inward radial movement of the abutment members to allow the lugs 29 to swing in a counter-clockwise direction about shafts 28 as axes. Consequently, the lugs 35 upon housing 7 will drive the shaft 2 through the agency of the lugs 29.

If a load in excess of the predetermined adjusted load comes upon the driven shaft 2, the tension of springs 25 will be overcome by the tendency of the lugs 29 to swing in a counter-clockwise direction (Fig. 1) and consequently said lugs will move past the radial direction, instantaneously disconnecting shafts 1 and 2. At this period of operation the driving shaft 1 will rotate freely, inasmuch as lugs 29 will have been rotated into the recesses in the abutment members as indicated at 39 in Figs. 1 and 4.

It can readily be seen, therefore, that with springs 25 of predetermined weight, the loading condition under which the clutch will disengage is dependent upon the radial position of the plugs 36. If plugs 36 are moved inwardly, radially, the lugs 29 in attempting to swing in a counter-clockwise direction must cause the abutment members to move radially against a relatively high compression of springs 25. If the plugs 36 are in an outwardly greater radial position, the resistance offered by the springs 35 to radial movement of the abutment members 19 is less. Consequently, in the first mentioned conditions a higher load will be reached before the clutch disengages and in the second mentioned condition the clutch will disengage at a lower load.

If desired, indicia (not shown) may be associated with the plugs 36 so that all of said plugs will be the same radial distance from the center line of shaft 2. If this latter precaution is not observed, the coil springs 25 will be loaded unequally and counter-clockwise movement of the lugs 29 will not take place simultaneously.

Although my device functions as an overload releasing clutch when a sudden overload is placed upon the driven system, it can also readily be seen that during normal driving operation there is a degree of flexibility between the driving and driven members inasmuch as the driven member is substantially floating upon springs 25. Therefore, my device additionally possesses the characteristics of a flexible coupling. By providing the requisite clearances, my device also compensates for tolerated inaccuracies of alignment in driving and driven shafts. In accomplishing this latter function the fact that the working ends of the lugs 29 are rounded as indicated at 31 and 32 in Figs. 3 and 1 respectively, permit a more efficient engagement between said working ends of the lugs and the lugs 35.

In order that the lugs 29, after being released due to an overload, do not swing out of the recesses in the abutment members 19, a blade spring 42 may be secured to the inner face of the central web portion 21 of said abutment member, the free end of the blade spring being adapted to bear against the side of each lug 29, tending to urge said lug in a counter-clockwise direction as viewed in Fig. 1. Consequently, if shaft 1 were utilized as the driving member and the lugs 29 were released due to an overload, centrifugal motion of the freely running driving member would not tend to swing said lugs outwardly or if shaft 2 were the driven member and the clutch had been released, the lugs 29 would not swing out of the abutment member recesses due to gravity.

A radial slot 43 is provided in the inner wall of the housing 7 and is adapted to carry a flexible annular washer 44 which normally rides against the outer surface of the flange 11 adjacent its periphery. The ring 44 may be constructed of rubber, rubberized fabric or the like and serves to prevent dirt from entering the housing 7.

After release of the clutch due to a condition of overload, the clutch may be reset in a manner similar to the original setting of the clutch. That is, the shafts 1 and 2 may be relatively rotated to bring the abutment members intermediate adjacent lugs 35. The lugs 39 may all be rotated in a clockwise direction (Fig. 1) until said lugs rest against the end defining wall of the recess in each abutment member. In this position, the shafts are relatively rotated until the lugs 29 contact the lugs 35. When, during resumption of operation, lugs 35 exert driving contact upon the lugs 29, said latter lugs are rotated in a counter-clockwise direction (Fig. 1) until the tips of the lugs 29 contact the respective plugs 36 at which time the springs 25 are compressed. Although the plugs 36, during the resetting operation may be screwed outwardly and then again readjusted after the lugs 29 and 35 are in contact, this is not necessary since the lugs 29 when rotated to their extreme clockwise position (Fig. 1) will pass beneath plugs 36 when said plugs are in their innermost radial position.

I claim as my invention:

1. An overload releasing clutch comprising in combination interfitting, shaft-connecting members including an inner member and an outer member mounted upon a pair of abutting shafts, a plurality of radially movable abutment members carried by said inner member, resilient elements urging said abutment members radially outwardly with respect to the axes of said shafts, a lug pivotally mounted upon each abutment member, a plurality of engaging members carried by said outer member, said pivotally mounted lugs being urged in driving contact with said engaging members by said resilient elements, said pivoted lugs being swingable away from said engaging members against the urging force of said resilient elements when the load upon the system exceeds the urging force of the resilient members.

2. An overload releasing clutch comprising in combination interfitting, shaft-connecting members including an inner member and an outer member mounted upon a pair of abutting shafts, a plurality of radially movable abutment members carried by said inner member, resilient elements urging said abutment members radially outwardly with respect to the axes of said shafts, a lug pivotally mounted upon each abutment member, a plurality of engaging members carried by said outer member, said pivotally mounted lugs being urged in driving contact with said engaging members by said resilient elements, said pivoted lugs being swingable away from said engaging members against the urging force of said resilient elements when the load upon the system exceeds the urging force of the resilient members, and means for controlling the urging force exerted by said resilient elements.

3. An overload releasing clutch comprising in combination interfitting, shaft-connecting members including an inner member and an outer member mounted upon a pair of abutting shafts, a plurality of abutment members carried by said inner member, resilient elements urging said abutment members radially outwardly with respect to the axes of said shafts, a lug pivotally mounted upon each abutment member, a plurality of engaging members carried by said outer member, said resilient elements urging said abutment members to a position to bring the pivotally mounted lugs into driving contact with said engaging members, said lugs being swingable away from said engaging members when the load upon the system exceeds the urging force of the resilient elements to cause inward radial movement of said abutment members.

4. An overload releasing clutch comprising in combination interfitting, shaft-connecting members including an inner member and an outer member mounted upon a pair of abutting shafts, a plurality of resilient elements mounted upon said inner member, abutment members carried by said inner member and urged radially outwardly a limited distance by said resilient elements, a lug pivoted upon each of said abutment members, engaging means carried by said outer member, said swingable lugs being adapted to be positioned in driving engagement with said engaging means, a radially adjustable member carried by said outer member adjacent each of said engaging means, said adjustable members being normally in the path of rotation of the face ends of said swingable lugs, whereby swinging movement of said lugs away from said engaging means is accompanied by inward radial movement of said abutment members against said resilient elements.

5. An overload releasing clutch comprising in combination interfitting, shaft-connecting members including an inner member and an outer member mounted upon a pair of abutting shafts, a plurality of resilient elements mounted upon said inner member, abutment members carried by said inner member and urged radially outwardly a limited distance by said resilient elements, a lug pivoted upon each of said abutment members, a plurality of engaging means carried by said outer member, said swingable lugs being adapted to be positioned in driving engagement with said engaging means, a plug threadedly engaged in said outer member and radially adjustable therein adjacent each of said engaging means, said plugs being normally in the path of rotation of the free ends of said swingable lugs, whereby swingable movement of said lugs away from said engaging means is accompanied by inward radial movement of said abutment members against said resilient elements.

6. An overload releasing clutch comprising in combination interfitting, shaft-connecting members including an inner member and an outer member mounted upon a pair of abutting shafts, said inner member comprising a pair of spaced annular flanges, said flanges being provided with circumferentially spaced radially extending recesses, a plurality of resilient elements mounted upon said inner member, abutment members carried by said inner member and urged radially outwardly a limited distance by said resilient elements, said abutment members engaging said recesses as guides, a lug pivoted upon each of said abutment members, a plurality of engaging means carried by said outer member, said swingable lugs being adapted to be positioned in driving engagement with said engaging means, a radially adjustable member carried by said outer member adjacent each of said engaging means, said adjustable members being normally in the path of rotation of the free ends of said swingable lugs, whereby swinging movement of said lugs away from said engaging means is accompanied by inward radial movement of said abutment members against said resilient elements.

FRED W. GROHN.